United States Patent [19]

Howie, Jr.

[11] Patent Number: 5,783,285
[45] Date of Patent: Jul. 21, 1998

[54] METHOD FOR OBTAINING A TIGHT, SECURE CONNECTION BETWEEN INTERFITTING MEMBERS AND THE CONNECTION RESULTING THEREFROM

[75] Inventor: Robert K. Howie, Jr., Decatur, Ill.

[73] Assignee: The Grigoleit Company, Decatur, Ill.

[21] Appl. No.: 502,271

[22] Filed: Jul. 13, 1995

[51] Int. Cl.$^6$ .................. B32B 3/00; B25G 3/00
[52] U.S. Cl. .................. 428/172; 428/101; 428/161; 428/167; 428/192; 264/241; 264/242; 403/347; 403/354; 403/359; 24/666; 24/669; 24/701
[58] Field of Search .................. 428/156, 188, 428/172, 161, 167, 192; 264/241, 242, 510; 403/347, 354, 359, 393, 361; 24/666, 669, 701, 702; 277/169, 182; 16/12

[56] References Cited

U.S. PATENT DOCUMENTS 4,475,737  10/1984  Cook et al. .................. 206/318
4,861,183  8/1989  Loos .................. 403/354

*Primary Examiner*—Donald Loney
*Attorney, Agent, or Firm*—Dorn, McEachran, Jambor & Keating

[57] ABSTRACT

A method for obtaining a tight, secure connection between two relatively non-deformable members and the connection resulting therefrom. The method includes the steps of forming a recess in a first of said members, forming a second member with a portion that seats in the recess of the first member, molding a liner of thermoplastic to one of the members, which thermoplastic is deformable but not more than slightly compressible, and seating the portion of the second member in the recess of the first member with one of the members engaging the liner to displace a portion of the liner into a void space in one of the members to thus form a tightly gripping connection between the members. A composite knob and its connection to shaft made in accordance with this method are also disclosed.

12 Claims, 1 Drawing Sheet

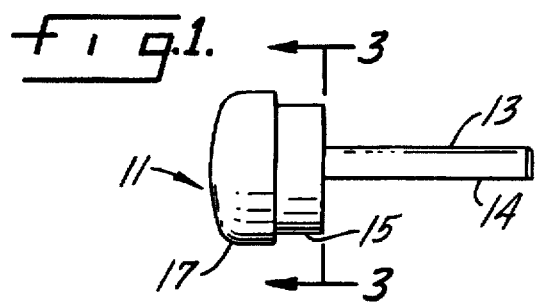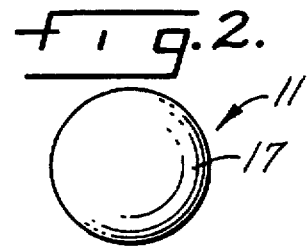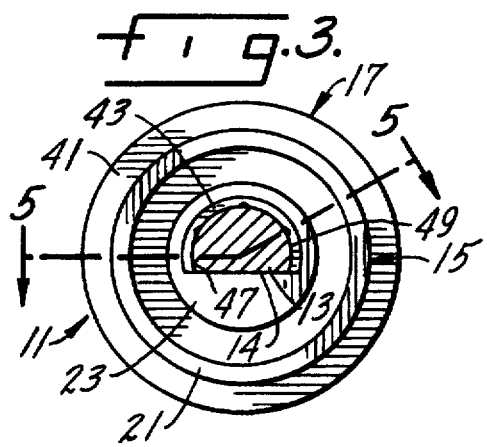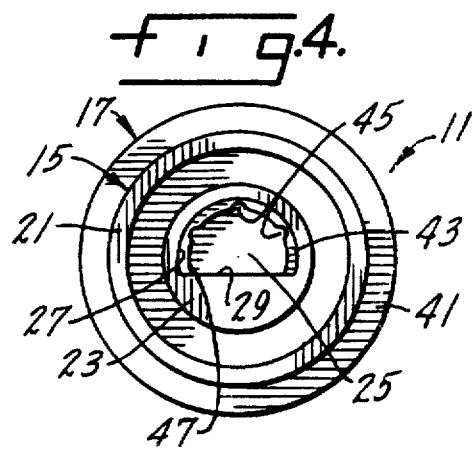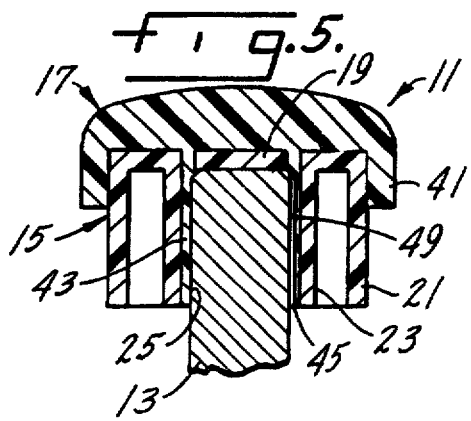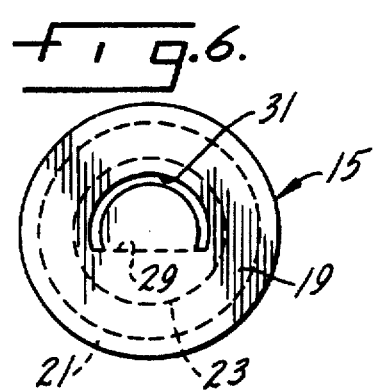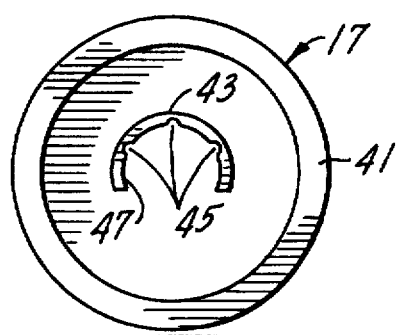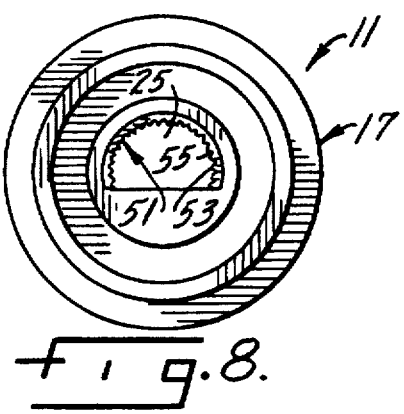

METHOD FOR OBTAINING A TIGHT, SECURE CONNECTION BETWEEN INTERFITTING MEMBERS AND THE CONNECTION RESULTING THEREFROM

BACKGROUND AND SUMMARY OF THE INVENTION

This invention is directed to a method for obtaining a tight, secure connection between two relatively non-deformable members and the connection obtained by the method. Presently, secure connections between relatively non-deformable members, such as injection molded thermoplastic parts, require the use of adhesives, mechanical fasteners, fusing, forced interference engagement or the provision of resilient webs or fingers in at least one of the parts. Each of these fastening methods adds expense to the manufacture of the products formed by the members and each method has inherent disadvantages. The inherent disadvantages of the aforesaid methods become more pronounced when the members that are to be joined must be removable and reinstallable relative to one another.

This invention overcomes the aforesaid difficulties by providing a deformable but essentially non-compressible liner between the non-deformed members which are to be attached. The tight, secure connection between the members is obtained by displacing the liner into one or more void spaces located in at least one of the members when the members are brought together to be connected.

The invention utilizes a soft moldable thermoplastic material which is displaceable and essentially non-deformable to create the interference fit between the generally non-deformable members to be connected.

This invention is particularly well directed to the molding of plastic knobs of the type which are designed to fit over a shaft formed of a hollow metal tubing such as aluminum and which are intended to be placed on and removed from a shaft.

Other objects of the invention will be found in the following specification, claims and drawings.

BRIEF DESCRIPTION OF THE DRAWINGS

The invention as applied to the manufacture of a knob is illustrated more or less diagrammatically in the following drawings wherein:

FIG. 1 is a side elevational view of the composite knob of this invention seated on a shaft;

FIG. 2 is a top plan view of the knob and shaft of FIG. 1;

FIG. 3 is an enlarged cross sectional view taken along lines 3—3 of FIG. 1;

FIG. 4 is an enlarged bottom view of the cap of FIG. 1 with the shaft removed from the socket of the cap;

FIG. 5 is a cross sectional view taken along line 5—5 of FIG. 3;

FIG. 6 is a top plan view of the core portion of the composite cap;

FIG. 7 is a bottom view of the cap portion of the composite knob; and

FIG. 8 is an enlarged end view of a modified form of cap with the shaft removed from the socket.

DESCRIPTION OF THE PREFERRED EMBODIMENTS

The method of this invention is adaptable to the manufacture and attachment of products and items of various types. For clarity of explanation, it will be described as applied to the manufacture of a composite knob which is removably mountable on a shaft.

FIG. 1 of the drawings shows a composite knob 11 of one embodiment of this invention manufactured in accordance with the method of this invention. The knob is intended to be seated on a shaft 13 for removal and reinstatement relative to the shaft. The shaft 13 is conventionally formed of metal, usually aluminum, and may be solid or tubular. A flat 14 is formed on one side of the shaft. The core 15 of the knob 11 is preferably injection molded of a thermoplastic material which under normal conditions of use is not deformable. The core conventionally includes a top wall 19, an outer skirt 21 which is formed integrally with the top wall and an inner hub 23 also formed integrally with the top wall. A socket 25 for receiving the shaft 13 is formed as part of the hub and is defined by an arcuate wall 27 and a flat wall 25 which engages the flat 14 of the shaft when the shaft is inserted in the socket. An arcuate passage 31 is formed in the top wall of the core immediately inwardly of the arcuate wall 27.

The cap 17 of the knob 11 is molded also of a thermoplastic material that is softer than the thermoplastic material of the core 15. The thermoplastic material of cap 17 is deformable but is not compressible under normal use, that is to say that it is, for practical purposes, not more than slightly compressible. A suitable material for the cap is a polyvinyl chloride or a thermoplastic rubber. The core 15 may be formed of a nylon.

The cap 17 may be molded in the second shot of a two shot molding process. The cap 17 is formed with a rim 41 which fits over a portion of the outer skirt 21 of the core. The cap also includes an arcuate shaped liner 43 which extends through the arcuate passage 31 in the top wall 19 of the core and into the socket 25 of the core adjacent the arcuate wall 27 thereof. The liner 43 has longitudinal grooves 45 formed in its concave inner wall 47 due to the insertion of pins or the like (not shown) during the molding process. Thus, when the composite knob is molded and before insertion of the shaft, the liner 43 is shown most clearly in FIG. 4 of the drawings where it is positioned against the arcuate inner wall 27 of the hub 23. The transverse cross section of the open socket 25 is smaller than the similar cross section of the shaft When the shaft 13 is inserted into the socket as shown in FIGS. 3 and 5 of the drawings, the convex wall 49 of the shaft engages and displaces the material of the liner 43 so that the deformable and generally non-compressible material of the liner 43 is moved into the longitudinal grooves 45 formed in the liner to create an interference fit between the shaft 13 and the hub 23 of the core 15. The longitudinal grooves 45 of the liner, in effect, are void spaces which receive the material of the liner as it is displaced when the shaft is inserted into the socket 25.

Upon removal of the shaft 13 from the socket 25 of the core 15, the liner 43 essentially returns to the shape shown in FIG. 4 of the drawings.

A second embodiment of the composite knob 11 is shown in FIG. 8 of the drawings. It is identical to the knob 11 previously described except for an alteration to the liner 43. Instead of being formed with three longitudinal grooves 45 in its concave inner wall 47, a plurality of serrations 51 are formed in the inner wall 47. When the shaft 13 is inserted in the socket 25, the material of the peaks 53 of the serrations are displaced into the valleys 55 located between the peaks which valleys function as void spaces to receive the displaced material of the liner 43.

Whereas, the method of my invention has been shown and described as applied to the manufacture of a knob which can be removably attached to a hollow metal shaft to obtain a tight secure connection between the relatively non-deformable plastic material of the knob and the non-deformable metal of the shaft, it should be apparent that the method can be applied to the fastening of other relatively non-deformable members using a liner of a deformable but not more than slightly compressible thermoplastic located between the non-deformable members and displaceable into void spaces in one of the members when the members are connected.

What is claimed is:

1. A method for obtaining a secure connection between two interfitting members, including the steps of:

forming a recess in a first of said members, forming said second member with a portion which seats in said recess of said first member, molding a liner of a thermoplastic to one of said members, said thermoplastic being deformable and only slightly compressible, providing a void space in one of said members in communication with said liner, and seating said portion of said second member in said recess of said first member with one of said members engaging said liner to displace a portion of said liner into said void space to form a tightly gripping connection between said first and second members.

2. The method of claim 1 in which at least one of said first and second members is relatively non-deformable.

3. The method of claim 1 in which at least one of said members engages said lining in an interference fit.

4. A deformable, tightly gripping connection between two relatively non-deformable members, a first of said non-deformable members having a socket, a second of said non-deformable members having a portion which seats in said socket, a liner of a thermoplastic which is deformable and only slightly compressible installed in said socket, and a void space formed in one of said members in communication with said liner, a portion of said liner being displaceable into said void space when said portion of said second non-deformable member is seated in said socket in engagement with said liner to tightly grip said first and second non-deformable members relative to each other.

5. A composite knob adapted to be removably attached to the end of a shaft, said knob including:

a core of a hard thermoplastic, said core having a shaft receiving socket defined by walls, a cap of thermoplastic which is deformable and only slightly compressible mounted on said core, and a portion of said thermoplastic of said cap extending into said core to form a liner having longitudinally extending grooves facing said socket, a portion of said liner being displaced into said grooves when said shaft is seated in said socket to tightly grip said shaft to said core.

6. The composite knob of claim 5 in which said liner is formed with an arcuate wall, said grooves are formed in said arcuate wall and said grooves are serrations.

7. A method for obtaining a secure connection between two interfitting members, including the steps of:

forming a recess in a first of said members, forming said second member with a portion which seats in said recess of said first member, molding a liner of a thermoplastic to one of said members, said thermoplastic being flowable when displaced, providing a void space in one of said members in communication with said liner, and seating said portion of said second member in said recess of said first member with one of said members engaging said liner to flow a portion of said liner into said void space to form a tightly gripping connection between said first and second members.

8. The method of claim 7 in which at least one of said first and second members is relatively non-deformable.

9. The method of claim 7 in which at least one of said members engages said lining in an interference fit.

10. A deformable, tightly gripping connection between two relatively non-deformable members, a first of said non-deformable members having a socket, a second of said non-deformable members having a portion which seats in said socket, a liner of a thermoplastic which is flowable when displaced, and a void space formed in one of said members in communication with said liner, a portion of said liner being flowable into said void space when said portion of said second non-deformable member is seated in said socket in engagement with said liner to tightly grip said first and second non-deformable members relative to each other.

11. A composite knob adapted to be removably attached to the end of a shaft, said knob including:

a core of a hard thermoplastic, said core having a shaft receiving socket defined by walls, a cap of thermoplastic which is flowable when displaced, and a portion of said thermoplastic of said cap extending into said core-to form a liner having longitudinally extending grooves facing said socket, a portion of said liner being flowable into said grooves when said shaft is seated in said socket to tightly grip said shaft to said core.

12. The composite knob of claim 11 in which said liner is formed with an arcuate wall, said grooves are formed in said arcuate wall and said grooves are serrations.

* * * * *